United States Patent
Wellington

(10) Patent No.: US 9,473,956 B2
(45) Date of Patent: Oct. 18, 2016

(54) ANTENNA TILT OPTIMIZATION IN A WIRELESS COMMUNICATIONS NETWORK

(71) Applicant: EDEN ROCK COMMUNICATIONS, LLC, Bothell, WA (US)

(72) Inventor: Daniel Wellington, Bothell, WA (US)

(73) Assignee: Nokia Solutions and Networks OY, Espoo (FI)

( * ) Notice: Subject to any disclaimer, the term of this patent is extended or adjusted under 35 U.S.C. 154(b) by 141 days.

(21) Appl. No.: 14/195,745

(22) Filed: Mar. 3, 2014

(65) Prior Publication Data

US 2015/0011227 A1   Jan. 8, 2015

Related U.S. Application Data

(60) Provisional application No. 61/842,335, filed on Jul. 2, 2013.

(51) Int. Cl.
| | |
|---|---|
| H04M 1/00 | (2006.01) |
| H04W 24/02 | (2009.01) |
| H04W 16/28 | (2009.01) |
| H04W 16/02 | (2009.01) |
| H04W 16/24 | (2009.01) |

(52) U.S. Cl.
CPC ............. *H04W 24/02* (2013.01); *H04W 16/28* (2013.01); *H04W 16/02* (2013.01); *H04W 16/24* (2013.01)

(58) Field of Classification Search
CPC ... H04W 16/02; H04W 16/12; H04W 16/24; H04W 16/28; H04W 88/085; H04W 88/08; H04W 14/02
USPC ....... 455/446, 447, 561, 562 A, 562.1, 422.1
See application file for complete search history.

(56) References Cited

U.S. PATENT DOCUMENTS

| | | | |
|---|---|---|---|
| 2009/0023477 A1 | 1/2009 | Staudte | |
| 2009/0061871 A1* | 3/2009 | Gross | H04W 36/0061 455/436 |
| 2010/0105398 A1 | 4/2010 | Engstrom | |
| 2010/0298015 A1 | 11/2010 | Medbo et al. | |
| 2011/0090820 A1* | 4/2011 | Hussein | H04W 24/02 370/255 |
| 2011/0092195 A1* | 4/2011 | Hussein | H04W 24/02 455/418 |
| 2011/0130144 A1* | 6/2011 | Schein | H04L 41/12 455/442 |
| 2011/0136478 A1* | 6/2011 | Trigui | H04W 24/02 455/418 |
| 2011/0222448 A1 | 9/2011 | Ofek et al. | |
| 2012/0225657 A1* | 9/2012 | Watanabe | H04W 36/0055 455/436 |
| 2012/0252440 A1* | 10/2012 | Watanabe | H04W 24/02 455/423 |
| 2013/0142183 A1* | 6/2013 | Lee | H04W 24/02 370/338 |
| 2013/0170362 A1* | 7/2013 | Futaki | H04W 24/02 370/241.1 |
| 2013/0242736 A1* | 9/2013 | Tarraf | H04W 24/02 370/235 |

FOREIGN PATENT DOCUMENTS

CN    102638833 B    * 11/2014

OTHER PUBLICATIONS

International Search Report and Written Opinion for PCT/US2014/020020, filed Mar. 3, 2014.

* cited by examiner

*Primary Examiner* — Jean Gelin

(57) ABSTRACT

Optimization of a wireless communications network may be accomplished by collecting information for a plurality of target cells neighboring a source cell, calculating a tilt score based on the collected information, and adjusting an antenna of the source cell based on the tilt score.

31 Claims, 15 Drawing Sheets

| Rank | Neighbor | HO Attempts | EcNo(dB) | RSCP(dBm) | Distance |
|---|---|---|---|---|---|
| 1 | CELL####### | 6575 | -13.54 | -95.47 | 0 |
| 2 | CELL####### | 4349 | -13.78 | -96.62 | 2.82 |
| 3 | CELL####### | 1208 | -16.83 | -99.88 | 2.82 |
| 4 | CELL####### | 2966 | -15.33 | -99.98 | 3.09 |
| 5 | CELL####### | 817 | -13.98 | -100.24 | 4.49 |
| 6 | CELL####### | 570 | -17.08 | -100.30 | 5.41 |
| 7 | CELL####### | 535 | -16.90 | -101.26 | 3.8 |
| 8 | CELL####### | 1672 | -16.12 | -101.46 | 3.31 |
| 9 | CELL####### | 974 | -14.57 | -101.87 | 5.29 |
| 10 | CELL####### | 371 | -17.81 | -101.99 | 6.02 |
| 11 | CELL####### | 384 | -16.03 | -102.30 | 3.36 |
| 12 | CELL####### | 199 | -17.51 | -102.34 | 5.41 |
| 13 | CELL####### | 146 | -15.30 | -103.09 | 3.85 |
| 14 | CELL####### | 643 | -17.04 | -103.21 | 4.28 |
| 15 | CELL####### | 83 | -17.33 | -103.67 | 3.84 |
| 16 | CELL####### | 858 | -16.80 | -104.30 | 4.62 |
| 17 | CELL####### | 880 | -17.29 | -104.87 | 4.72 |
| 18 | CELL####### | 457 | -17.84 | -104.93 | 5.7 |
| 19 | CELL####### | 215 | -17.36 | -105.38 | 3.84 |
| 20 | CELL####### | 171 | -17.71 | -105.49 | 2.43 |
| 21 | CELL####### | 147 | -15.54 | -105.49 | 3.54 |
| 22 | CELL####### | 708 | -15.94 | -105.93 | 3.76 |
| 23 | CELL####### | 173 | -18.46 | -106.13 | 3.73 |
| 24 | CELL####### | 431 | -16.78 | -106.84 | 4.32 |
| 25 | CELL####### | 877 | -17.64 | -106.66 | 1.7 |

| Rank | Scrambling Code | Counts | EcNo | RSCP | Distance |
|---|---|---|---|---|---|
| 1 | 315 | 3009 | -13.15 | -94.43 | 2.5 |
| 2 | 411 | 1275438 | -11.13 | -94.61 | 1.77 |
| 3 | 419 | 9765 | -10.87 | -94.75 | 1.77 |
| 4 | 252 | 51000 | -12.65 | -97 | 10.7 |
| 5 | 96 | 23414 | -16.79 | -98.22 | 8.89 |
| 6 | 149 | 28636 | -14.02 | -98.73 | 11.85 |
| 7 | 152 | 1846 | -15.9 | -99.05 | 8.2 |
| 8 | 48 | 15232 | -15.91 | -99.36 | 8.3 |
| 9 | 124 | 54344 | -10.49 | -100.03 | 12.4 |
| 10 | 105 | 23084 | -13.22 | -100.03 | 2.81 |
| 11 | 179 | 3691 | -14.3 | -100.04 | 1.6 |
| 12 | 277 | 14472 | -16.79 | -100.97 | 10.5 |
| 13 | 216 | 49119 | -13.16 | -101.11 | 9.5 |
| 14 | 104 | 13538 | -15.01 | -101.15 | 8.9 |
| 15 | 392 | 4829 | -12.89 | -101.16 | 6.3 |
| 16 | 202 | 15715 | -17.56 | -101.28 | 3.4 |
| 17 | 388 | 6447 | -16.85 | -101.33 | 7.9 |
| 18 | 349 | 7150 | -13.57 | -101.39 | 15 |
| 19 | 157 | 9748 | -13.85 | -102.19 | 11.8 |
| 20 | 204 | 9895 | -18.3 | -102.41 | 9.59 |
| 21 | 442 | 29562 | -16.56 | -102.42 | 7.65 |
| 22 | 88 | 13014 | -15.04 | -102.45 | 9.19 |
| 23 | 297 | 18522 | -12.94 | -102.45 | 3.67 |
| 24 | 344 | 8923 | -14.85 | -102.5 | 4.19 |
| 25 | 336 | 4662 | -18.82 | -102.5 | 4.3 |

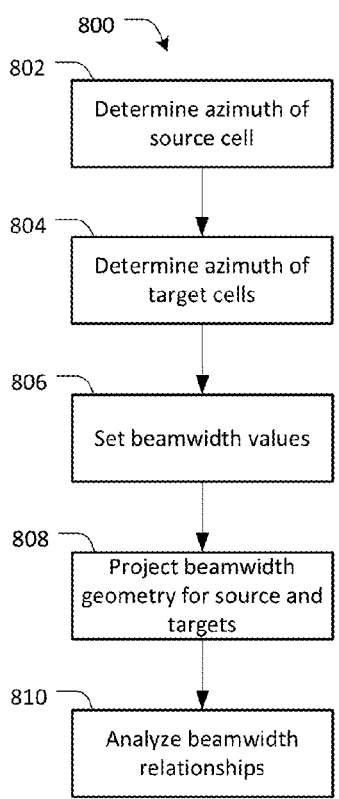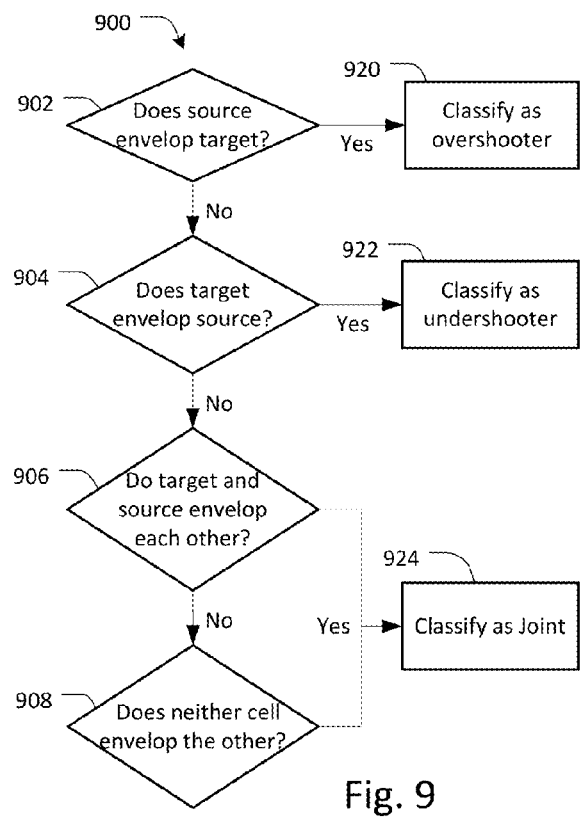
Fig. 8
Fig. 9

| Rank | Neighbor | HO Attempts | Ec/Io (dB) | RSCP (dBm) | Distance | Scenario | new_d | RSCP - RSCP THRESH | ECNO - ECNO THRESH | TILT SCORE |
|---|---|---|---|---|---|---|---|---|---|---|
| 1 | CELL######### | 6575 | -13.54 | -95.47 | 0 | Co-site | 0 | 13.53 | 5.46 | 0.00 |
| 2 | CELL######### | 4349 | -13.78 | -96.62 | 2.82 | Overshoot | 2.82 | 12.38 | 5.22 | 65.49 |
| 3 | CELL######### | 1303 | -16.93 | -99.88 | 2.82 | Overshoot | 2.82 | 9.12 | 2.17 | 33.13 |
| 4 | CELL######### | 2966 | -15.33 | -99.96 | 3.09 | Joint | 0 | 9.04 | 3.47 | 0.00 |
| 5 | CELL######### | 817 | -13.98 | -100.23 | 4.48 | Joint | 0 | 8.76 | 5.02 | 0.00 |
| 6 | CELL######### | 570 | -17.08 | -100.33 | 5.41 | Undershoot | -5.41 | 8.70 | 1.92 | -50.44 |
| 7 | CELL######### | 535 | -16.90 | -101.25 | 3.6 | Joint | 0 | 7.74 | 2.10 | 0.00 |
| 8 | CELL######### | 1672 | -16.12 | -101.45 | 3.31 | Undershoot | -3.31 | 7.54 | 2.88 | -38.34 |
| 9 | CELL######### | 974 | -14.57 | -101.87 | 5.29 | Joint | 0 | 7.13 | 4.43 | 0.00 |
| 10 | CELL######### | 371 | -17.81 | -101.99 | 6.02 | Joint | 0 | 7.01 | 1.19 | 0.00 |
| 11 | CELL######### | 884 | -16.03 | -102.30 | 3.36 | Overshoot | 3.36 | 6.70 | 2.97 | 25.76 |
| 12 | CELL######### | 199 | -17.51 | -102.34 | 5.41 | Undershoot | -5.41 | 6.66 | 1.49 | -28.61 |
| 13 | CELL######### | 146 | -15.30 | -103.09 | 3.83 | Joint | 0 | 5.91 | 3.70 | 0.00 |
| 14 | CELL######### | 643 | -17.04 | -103.23 | 4.26 | Joint | 0 | 5.79 | 1.96 | 0.00 |
| 15 | CELL######### | 83 | -17.23 | -103.67 | 3.64 | Joint | 0 | 5.33 | 1.77 | 0.00 |
| 16 | CELL######### | 853 | -16.98 | -104.33 | 4.62 | Joint | 0 | 4.70 | 2.30 | 0.00 |
| 17 | CELL######### | 889 | -17.29 | -104.67 | 4.72 | Joint | 0 | 4.33 | 1.71 | 0.00 |
| 18 | CELL######### | 457 | -17.84 | -104.93 | 5.7 | Joint | 0 | 4.07 | 1.16 | 0.00 |
| 19 | CELL######### | 235 | -17.36 | -105.38 | 3.84 | Overshoot | 3.84 | 3.62 | 1.64 | 13.47 |
| 20 | CELL######### | 171 | -17.71 | -105.45 | 2.43 | Undershoot | -2.43 | 3.55 | 1.29 | -7.26 |
| 21 | CELL######### | 147 | -15.54 | -105.49 | 3.54 | Joint | 0 | 3.51 | 3.46 | 0.00 |
| 22 | CELL######### | 708 | -15.54 | -105.93 | 3.76 | Undershoot | -3.76 | 3.07 | 3.46 | -22.71 |
| 23 | CELL######### | 173 | -18.46 | -106.13 | 3.73 | Joint | 0 | 2.87 | 0.54 | 0.00 |
| 24 | CELL######### | 433 | -16.78 | -106.64 | 4.32 | Undershoot | -4.32 | 2.36 | 2.22 | -16.17 |
| 25 | CELL######### | 377 | -17.64 | -106.65 | 2.7 | Undershoot | -2.7 | 2.35 | 1.36 | -4.97 |
| | | | | | | | | | TILT_SCORE | -30.6 |

Fig. 16A

| RNC Id | Cell Name | Target SC | Report Count | Ec/No (dB) | RSCP (dBm) | Distance | Scenario | news_d | RSCP-RSCP THRESH | EcNo-EcNo THRESH | TILT SCORE DSH |
|---|---|---|---|---|---|---|---|---|---|---|---|
| RNC-624 | CELL######## | 137 | 1974 | -15.28 | -98.21 | 6.1 | Overshooting | 6.1 | 10.79 | 3.72 | 13.07 |
| RNC-624 | CELL######## | 232 | 12293 | -15 | -99.01 | 13.6 | Undershooting | -13.6 | 9.99 | 4 | -103.66 |
| RNC-624 | CELL######## | 156 | 6072 | -14.07 | -99.25 | 9.2 | Joint | 0 | 9.75 | 4.93 | 0.00 |
| RNC-624 | CELL######## | 281 | 84992 | -12.48 | -99.5 | 13.7 | Joint | 0 | 9.5 | 6.52 | 0.00 |
| RNC-624 | CELL######## | 459 | 86672 | -13.68 | -100.34 | 4.5 | Joint | 0 | 8.89 | 5.36 | 0.00 |
| RNC-624 | CELL######## | 419 | 3046 | -16.77 | -100.84 | 3.05 | Overshooting | 3.05 | 8.16 | 2.23 | 7.66 |
| RNC-624 | CELL######## | 148 | 2069 | -16.99 | -100.89 | 9.2 | Joint | 0 | 8.11 | 3.41 | 0.00 |
| RNC-624 | CELL######## | 297 | 14393 | -15.13 | -100.91 | 0 | Joint | 0 | 8.09 | 3.87 | 0.00 |
| RNC-624 | CELL######## | 92 | 25481 | -13.24 | -101.03 | 6.25 | Undershooting | -6.25 | 7.97 | 5.76 | -60.34 |
| RNC-624 | CELL######## | 24 | 1194 | -13.84 | -101.66 | 0 | ARFA | 0 | 7.34 | 5.16 | 0.00 |
| RNC-624 | CELL######## | 213 | 3494 | -13.81 | -101.88 | 6.6 | Overshooting | 6.6 | 7.12 | 3.19 | 12.49 |
| RNC-624 | CELL######## | 16 | 31671 | -11.94 | -102.49 | 4.9 | Undershooting | -4.9 | 6.51 | 7.09 | -49.85 |
| RNC-624 | CELL######## | 411 | 28037 | -11.94 | -102.55 | 3.05 | Overshooting | 3.05 | 6.45 | 7.36 | 28.45 |
| RNC-624 | CELL######## | 376 | 5736 | -13.66 | -102.99 | 3.5 | Undershooting | -3.5 | 6.01 | 5.34 | -19.65 |
| RNC-624 | CELL######## | 27 | 1785 | -17.44 | -103.1 | 3.8 | Overshooting | 3.8 | 5.9 | 1.56 | 3.50 |
| RNC-624 | CELL######## | 113 | 37732 | -13.13 | -103.18 | 9.8 | Undershooting | -9.8 | 5.82 | 5.57 | -96.31 |
| RNC-624 | CELL######## | 95 | 2886 | -16.15 | -103.51 | 5.53 | Joint | 0 | 5.49 | 2.54 | 0.00 |
| RNC-624 | CELL######## | 429 | 1952 | -15.71 | -103.64 | 6.2 | Undershooting | -6.2 | 5.36 | 2.29 | 7.79 |
| RNC-624 | CELL######## | 124 | 18774 | -14.3 | -103.82 | 8.9 | Joint | 0 | 5.18 | 4.7 | 0.00 |
| RNC-624 | CELL######## | 329 | 7468 | -17.42 | -103.93 | 13.05 | Undershooting | -13.05 | 5.07 | 1.58 | -57.74 |
| RNC-624 | CELL######## | 28 | 18460 | -14.95 | -104.06 | 8.9 | Undershooting | -8.9 | 4.94 | 4.05 | -50.68 |
| RNC-624 | CELL######## | 341 | 3075 | -15.01 | -104.09 | 4.8 | Joint | 0 | 4.91 | 3.99 | 0.00 |
| RNC-624 | CELL######## | 445 | 2013 | -16.68 | -104.11 | 10.7 | Overshooting | 10.7 | 4.89 | 3.32 | -11.89 |
| RNC-624 | CELL######## | 183 | 1729 | -15.9 | -104.33 | 4.4 | Joint | 0 | 4.67 | 3.1 | 0.00 |
| RNC-624 | CELL######## | 323 | 27397 | -13.58 | -104.38 | 13.2 | Undershooting | -13.2 | 4.62 | 5.46 | -76.42 |
| | | | | | | | | | | | -437.2 |

Fig. 16B

ANTENNA TILT OPTIMIZATION IN A WIRELESS COMMUNICATIONS NETWORK

CROSS-REFERENCES TO RELATED APPLICATIONS

This disclosure claims priority to U.S. Provisional Application No. 61/842,335, filed Jul. 2, 2013, which is incorporated by reference herein.

BACKGROUND OF THE INVENTION

As technology advances, more and more data is transferred over cellular telecommunications networks. The number of subscribers continues to grow, as does the number user equipment (UE) utilizing wireless communication channels. In addition, as streaming services become more sophisticated and popular, the amount of data communicated between UE and base stations of a cellular network continues to grow. Cellular providers are regularly adding new equipment and optimizing existing equipment in order to keep pace with the increasing demands.

Cellular communications are affected by a variety of environmental conditions. Foliage develops during spring and recedes in the fall. Man-made structures are built and destroyed. Geographic features are altered by human and natural processes. All of these changes to environmental conditions can affect cellular service over time. Tools for monitoring network parameters and adjusting variables help operators to keep networks running smoothly as networks expand and change over time.

Antenna tilt optimization is one processes available to an operator to improve voice call quality, voice and data dropped call performance, voice and data accessibility, data throughput, capacity and spectral efficiency. In wireless operator markets with hilly terrain, elevated expressways and/or non-homogeneous antenna heights, proper antenna tilt is crucial to good performance. All markets have a need for proper antenna tilt, but the benefits are more pronounced in markets with varying topography.

In many cases, previous tilt optimization has been done in the market. Typically a cell's Key Performance Indicator (KPI) statistics will look better when the pattern is not overshooting even when excessive tilt is applied, so downtilt in some systems is greater than optimal. In some cases, calls will be redirected to an alternate Radio Access Technology (RAT) due to lack of coverage optimization. For example, calls may be directed to 2G because of inadequate 3G coverage due to excessive downtilt of antennas carrying 3G signals.

BRIEF SUMMARY OF THE INVENTION

This disclosure relates to a system, device, and method for optimizing tilt of a cellular base station antenna. Embodiments may be used to discover sub-optimal antenna tilt configuration in a network and to suggest or implement changes to antenna tilt. Interference detection information and neighbor relationships may be used as inputs to analyze existing tilt configurations.

In an embodiment, a method for optimization of a wireless communications network includes collecting information for a plurality of target cells neighboring a source cell, calculating a tilt score based on the collected information, and adjusting an antenna of the source cell based on the tilt score. Collecting the information for the plurality of target cells may include comparing an activity metric for each cell on an NCL of the source cell to a threshold value and when the activity metric exceeds the threshold value, adding the cell associated with the activity metric to a mobility neighbor list.

In an embodiment, optimization further includes sorting cells on the mobility neighbor list in descending order according to a signal strength value and truncating the mobility neighbor list. Collecting the information for the plurality of target cells may include receiving detected set reports (DSR) at the source cell and creating a DSR neighbor list from the received DSRs.

In an embodiment, creating the DSR neighbor list includes comparing an activity metric for each cell on the DSRs to a threshold value, and when the activity metric exceeds the threshold value, adding the cell associated with the activity metric to the DSR neighbor list. Creating the DSR neighbor list may include sorting cells on the DSRs in descending order according to a signal strength value and truncating the list of sorted cells. In addition, creating the DSR neighbor list may include associating cell identifiers with scrambling codes of the DSR.

In an embodiment, collecting the information for the plurality of target cells includes creating a first neighbor list including a first set of performance metrics and creating a second neighbor list including a second set of performance metrics. The first neighbor list may be a mobility neighbor list, and the second neighbor list may be a DSR neighbor list. Calculating the tilt score may include calculating a first tilt score for the first neighbor list, calculating a second tilt score for the second neighbor list, and adding the first tilt score and the second tilt score. The first tilt score may be weighted before the first and second tilt scores are added.

In an embodiment, the collected information includes distance information, signal strength information, and activity information. Collecting information for the plurality of target cells neighboring a source cell may include determining a set of intra-frequency cells neighboring the source cell, comparing a metric associated with each cell of the set of source cells to a threshold value, and when the metric exceeds the threshold value, adding the cell associated with the metric to a list. The metric may be an activity metric indicating a level of activity with respect to the associated cell. Adjusting the antenna may include adjusting one of a transmit power and a tilt angle of the source cell.

Although the above embodiments have been described with respect to method steps, aspects of this disclosure may be implemented as a communications system. For example, embodiments may include a computer system comprising a processor, a memory, and a computer readable medium including instructions which, when implemented by the processor, perform one or more of the method steps described above.

BRIEF DESCRIPTION OF THE DRAWINGS

FIGS. 7A and 7B illustrate neighbor lists according to embodiments.

FIG. 8 illustrates a process for evaluating a relationship between a source cell and a neighboring cell according to an embodiment.

FIG. 9 illustrates a process for determining relationships between projected beamwidth geometries of a source cell and neighboring cells according to an embodiment.

FIGS. 14A and 14B illustrate data tables for calculating a tilt score according to an embodiment.

FIGS. 16A and 16B illustrate data tables for calculating a tilt score according to an embodiment.

DETAILED DESCRIPTION OF THE INVENTION

Figure 1:
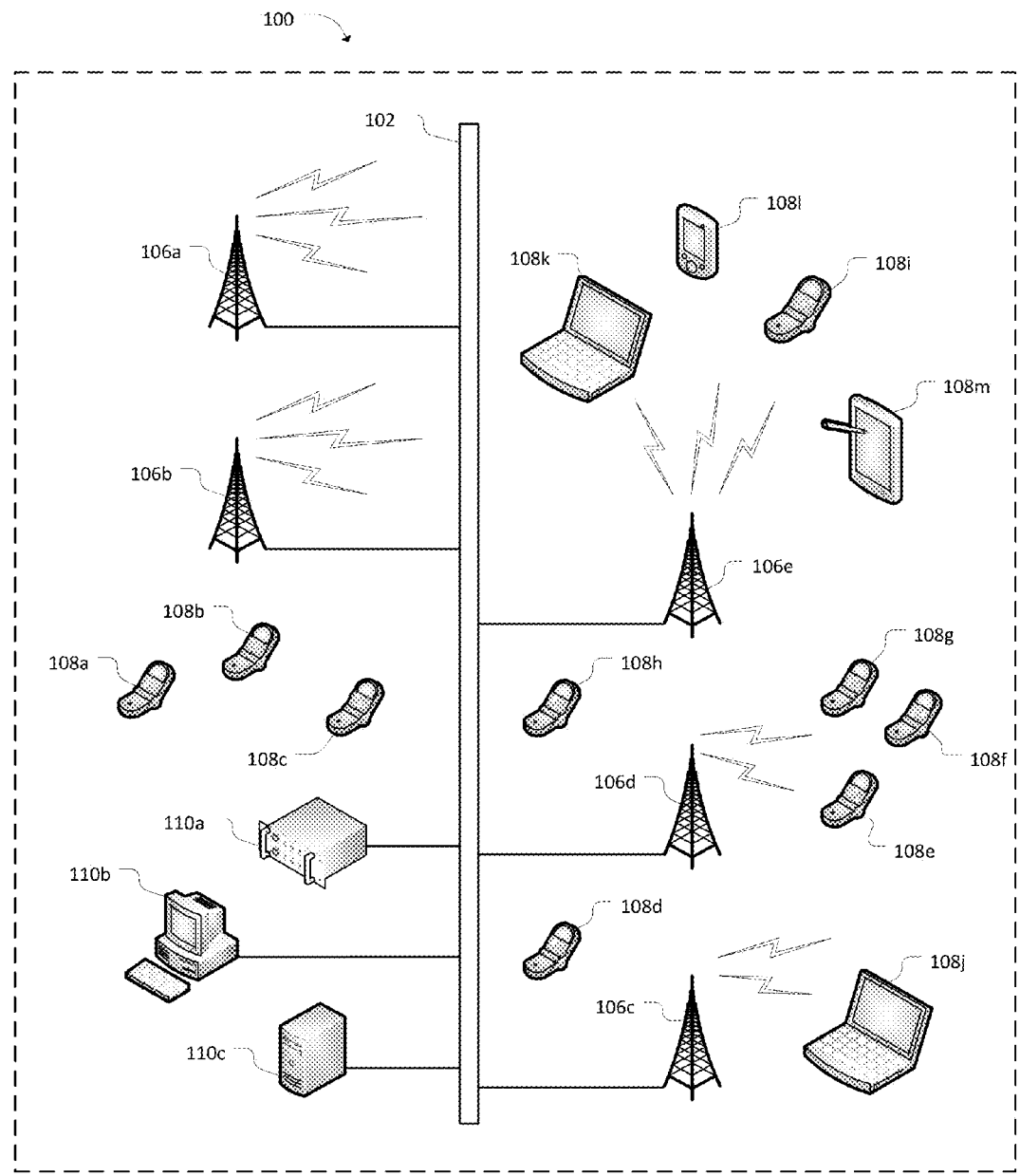
FIG. 1 illustrates a system according to an embodiment.

In the following detailed description, reference is made to the accompanying drawings, which form a part of the description. The example embodiments described in the detailed description, drawings, and claims are not meant to be limiting. Other embodiments may be utilized, and other changes may be made, without departing from the spirit or scope of the subject matter presented herein. It will be understood that the aspects of the present disclosure, as generally described herein and illustrated in the drawings, may be arranged, substituted, combined, separated, and designed in a wide variety of different configurations.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of embodiments is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

FIG. 1 illustrates an example networked computing system 100 according to an embodiment of this disclosure. As depicted, system 100 includes a data communications network 102, one or more base stations 106a-e, one or more network resource controller 110a-c, and one or more User Equipment (UE) 108a-m. As used herein, the term "base station" refers to a wireless communications station provided in a location and serves as a hub of a wireless network. The base stations may include macrocells, microcells, picocells, and femtocells.

In a system 100 according to an embodiment, the data communications network 102 may include a backhaul portion that can facilitate distributed network communications between any of the network controller devices 110 a-c and any of the base stations 106a-e. Any of the network controller devices 110a-c may be a dedicated Network Resource Controller (NRC) that is provided remotely from the base stations or provided at the base station. Any of the network controller devices 110a-c may be a non-dedicated device that provides NRC functionality among others. The one or more UE 108a-m may include cell phone devices 108a-i, laptop computers 108j-k, handheld gaming units 108l, electronic book devices or tablet PCs 108m, and any other type of common portable wireless computing device that may be provided with wireless communications service by any of the base stations 106a-e.

As would be understood by those skilled in the Art, in most digital communications networks, the backhaul portion of a data communications network 102 may include intermediate links between a backbone of the network which are generally wire line, and sub networks or base stations 106a-e located at the periphery of the network. For example, cellular user equipment (e.g., any of UE 108a-m) communicating with one or more base stations 106a-e may constitute a local sub network. The network connection between any of the base stations 106a-e and the rest of the world may initiate with a link to the backhaul portion of an access provider's communications network 102 (e.g., via a point of presence).

In an embodiment, an NRC has presence and functionality that may be defined by the processes it is capable of carrying out. Accordingly, the conceptual entity that is the NRC may be generally defined by its role in performing processes associated with embodiments of the present disclosure. Therefore, depending on the particular embodiment, the NRC entity may be considered to be either a hardware component, and/or a software component that is stored in computer readable media such as volatile or non-volatile memories of one or more communicating device(s) within the networked computing system 100.

In an embodiment, any of the network controller devices 110a-c and/or base stations 106a-e may function independently or collaboratively to implement processes associated with various embodiments of the present disclosure. Further, processes within the system may be carried out via any common communications technology known in the Art, such as those associated with modern Global Systems for Mobile (GSM), Universal Mobile Telecommunications System (UMTS), Long Term Evolution (LTE) network infrastructures, etc.

In accordance with a standard GSM network, any of the network controller devices 110a-c (NRC devices or other devices optionally having NRC functionality) may be associated with a base station controller (BSC), a mobile switching center (MSC), a data scheduler, or any other common service provider control device known in the art, such as a radio resource manager (RRM). In accordance with a standard UMTS network, any of the network controller devices 110a-c (optionally having NRC functionality) may be associated with a NRC, a serving GPRS support node (SGSN), or any other common network controller device known in the art, such as an RRM. In accordance with a standard LTE network, any of the network controller devices 110a-c (optionally having NRC functionality) may be associated with an eNodeB base station, a mobility management entity (MME), or any other common network controller device known in the art, such as an RRM.

In an embodiment, any of the network controller devices 110a-c, the base stations 106a-e, as well as any of the UE 108a-m may be configured to run any well-known operating system, including, but not limited to: Microsoft® Windows®, Mac OS®, Google® Chrome®, Linux®, Unix®, or any mobile operating system, including Symbian®, Palm®, Windows Mobile®, Google® Android®, Mobile Linux®, etc. Any of the network controller devices 110a-c, or any of the base stations 106a-e may employ any number of common server, desktop, laptop, and personal computing devices.

In an embodiment, any of the UE 108a-m may be associated with any combination of common mobile computing devices (e.g., laptop computers, tablet computers, cellular phones, handheld gaming units, electronic book devices, personal music players, MiFi™ devices, video recorders, etc.), having wireless communications capabilities employing any common wireless data communications technology, including, but not limited to: GSM, UMTS, 3GPP LTE, LTE Advanced, WiMAX, etc.

In an embodiment, the backhaul portion of the data communications network 102 of FIG. 1 may employ any of the following common communications technologies: optical fiber, coaxial cable, twisted pair cable, Ethernet cable, and power-line cable, along with any other wireless communication technology known in the art. In context with various embodiments of the invention, it should be understood that wireless communications coverage associated with various data communication technologies (e.g., base stations 106a-e) typically vary between different service provider networks based on the type of network and the system infrastructure deployed within a particular region of a network (e.g., differences between GSM, UMTS, LTE, LTE Advanced, and WiMAX based networks and the technologies deployed in each network type).

Figure 2:
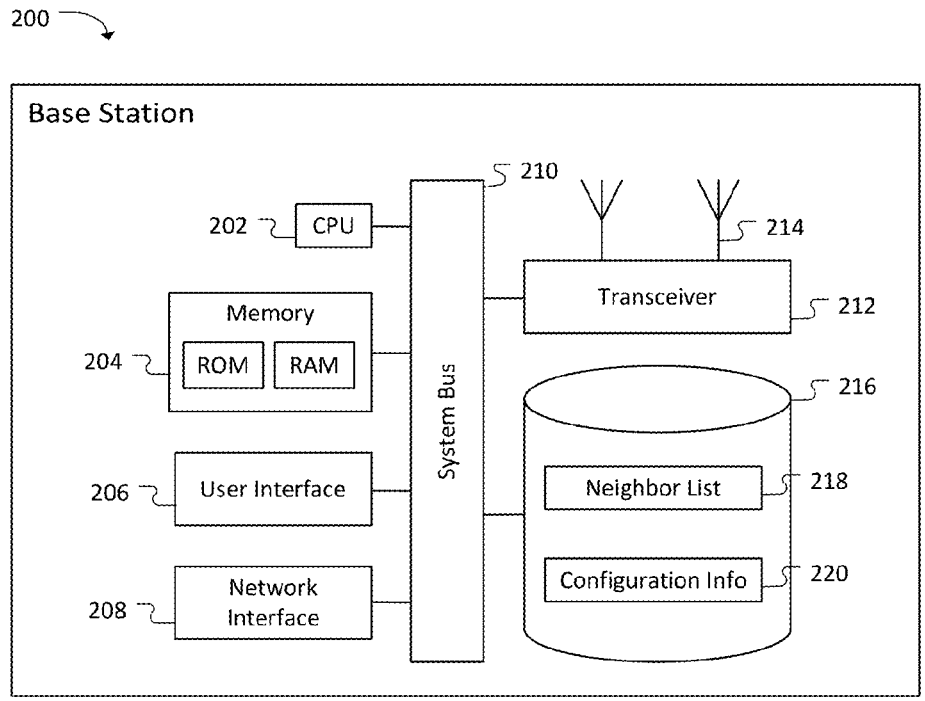
FIG. 2 illustrates a network resource controller according to an embodiment.

FIG. 2 illustrates a block diagram of a base station 200 (e.g., a femtocell, picocell, microcell or macrocell) that may be representative of the base stations 106a-e in FIG. 1. In an embodiment, the base station 200 includes at least one central processing unit (CPU) 202. The CPU 202 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 202 is responsible for executing computer programs stored on volatile (RAM) and non-volatile (ROM) system memories 204.

Base station 200 may include a user interface 206 for inputting and retrieving data to and from the base station by operator personnel, and a network interface coupled to a wireline portion of the network. In an embodiment, the base station 200 may send and receive scheduling information to and from an NRC, transmit signal data to an NRC, and share UE data with other base stations through network interface 208. Meanwhile, base station 200 wirelessly sends and receives information to and from UE through transceiver 212, which is equipped with one or more antenna 214.

The base station 200 may further include a system bus 210 and data storage 216. The system bus facilitates communication between the various components of the base station. For example, system bus 210 may facilitate communication between a program stored in data storage 216 and CPU 202 which executes the program. In an embodiment, data storage 216 may store one or more neighbor list 218 and configuration information 220. In addition, data storage 216 may include an operating system, and various programs related to the operation of the base station 200.

In various embodiments, the base station 200 may use any modulation/encoding scheme known in the art such as Binary Phase Shift Keying (BPSK, having 1 bit/symbol), Quadrature Phase Shift Keying (QPSK, having 2 bits/symbol), and Quadrature Amplitude Modulation (e.g., 16-QAM, 64-QAM, etc., having 4 bits/symbol, 6 bits/symbol, etc.). Additionally, the base station 200 may be configured to communicate with UEs 108a-m via any Cellular Data Communications Protocol, including any common GSM, UMTS, WiMAX or LTE protocol.

Figure 3:
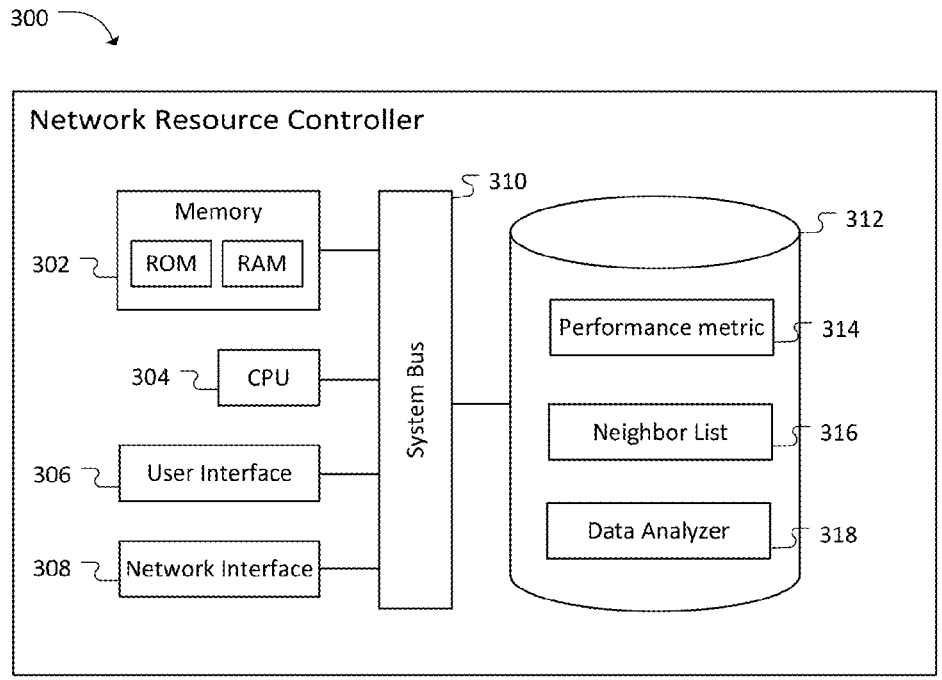
FIG. 3 illustrates a base station according to an embodiment.

FIG. 3 illustrates a block diagram of an NRC 300 that may be representative of any of the network controller devices 110a-c. In an embodiment, one or more of the network controller devices 110a-c are SON controllers. The NRC 300 includes one or more processor devices including a central processing unit (CPU) 304. The CPU 304 may include an arithmetic logic unit (ALU) (not shown) that performs arithmetic and logical operations and one or more control units (CUs) (not shown) that extracts instructions and stored content from memory and then executes and/or processes them, calling on the ALU when necessary during program execution.

The CPU 304 is responsible for executing computer programs stored on volatile (RAM) and nonvolatile (ROM) memories 302 and a storage device 312 (e.g., HDD or SSD). In some embodiments, storage device 312 may store program instructions as logic hardware such as an ASIC or FPGA. Storage device 312 may store performance metrics 314, neighbor list information 316, and data analyzer 318. Data analyzer 318 may include program information for executing one or more form of data analysis described below, such as comparing source and target cells and calculating a tilt score.

The NRC 300 may also include a user interface 306 that allows an administrator to interact with the NRC's software and hardware resources and to display the performance and operation of the networked computing system 100. In addition, the NRC 300 may include a network interface 306 for communicating with other components in the networked computer system, and a system bus 310 that facilitates data communications between the hardware resources of the NRC 300.

In addition to the network controller devices 110a-c, the NRC 300 may be used to implement other types of computer devices, such as an antenna controller, an RF planning engine, a core network element, a database system, or the like. Based on the functionality provided by an NRC, the storage device of such a computer serves as a repository for software and database thereto.

In a wireless system, data schedulers control the uplink and downlink transmissions in the network. The data schedulers can either reside at the base stations (e.g. eNodeBs in an LTE network) in the network or at a centralized location (e.g. RNC in UMTS networks). An RRM informs each of the data schedulers in the network of the frequency and time resources on which they can transmit and receive data.

Figure 4:
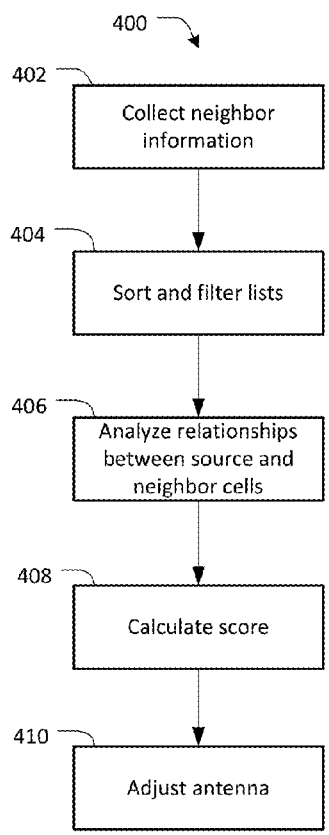
FIG. 4 illustrates a process for antenna optimization in a wireless communications system.

FIG. 4 illustrates an embodiment of a process 400 for antenna optimization in a wireless communications system. Steps of process 400 are generally explained in the following description, and explained in further detail with respect to subsequent figures and processes. Process 400 is described with respect to a source cell, which is a cell for which antenna characteristics are optimized, and target cells, which are cells that are analyzed to optimize antenna characteristics of the source cell.

In step 402, information for neighboring cells is collected. The neighboring cells may be cells in the geographic vicinity of the source cell. Neighbor cells which use the same technology and operate on the same frequency as the source cell are known as intra-frequency neighbors. Neighbor cells which use the same technology, but operate on different frequencies as the source cell are known as inter-frequency neighbors. Neighbor cells which use different technologies as the source cell are known as inter-RAT neighbors.

In an embodiment, two lists are collected—a list of neighbors determined from detected set reports (DSR), and a neighbor cell list (NCL) already configured for the source cell. In an embodiment, the source base station retrieves, sorts and filters the NCL to create a first neighbor list. Similarly, the source base station may receive DSRs from attached UE and combine that information into a second list.

In step 404, the one or more lists are filtered and sorted. The lists may be filtered according to activity data, sorted in order of signal strength, and then truncated so that less relevant cells are not included in subsequent analysis.

In step 406, a geometric relationship between the source cell and each cell on the one or more lists is analyzed. In an embodiment, the projected beamwidth of the cells are analyzed to determine whether the source cell is overlapped by projected beamwidths of each target cell, and vice versa.

In step 408, scores are calculated to quantify an overlap or underlap condition of the source cell. In an embodiment, an overshooting condition may be characterized by a positive score, while an undershooting condition is characterized by a negative score. The magnitude of the overlap or underlap condition may correspond to the magnitude of the score.

In step 410, an antenna parameter of the source cell may be adjusted based on the score calculated in process 408. In an embodiment, the antenna parameter is chosen from the tilt angle of the antenna and the transmit power of the antenna. In a system with remote electrical tilt (RET), tilting may be implemented by the system. Adjustment may be executed in an iterative process.

Figure 5:
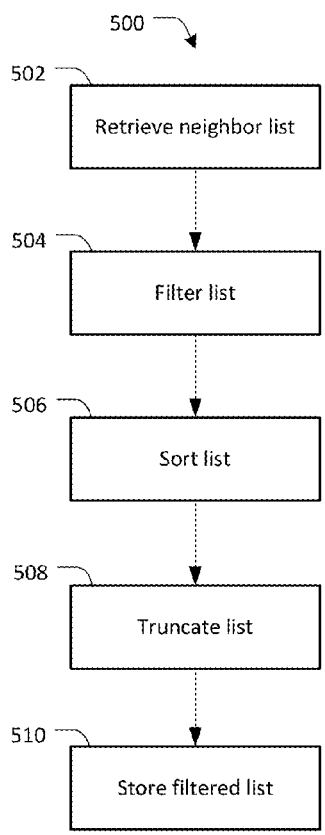
FIG. 5 illustrates a process for creating a neighbor list for a source cell according to an embodiment.

FIG. 5 illustrates an embodiment of a process 500 for creating a first neighbor list for a source cell. Conventional neighbor cell lists (NCL) are used by cellular systems for mobility purposes. Each source cell is associated with an NCL of neighbors to which UEs can handover from the source cell as the UEs move across a geographical area. In an embodiment, data from the NCL that are used for mobility purposes may be used to create a neighbor list for antenna optimization. Such a list for antenna optimization may be referred to as a mobility neighbor list.

A neighbor list may be retrieved in step 502. In an embodiment, the list is the NCL that is maintained by the source base station. The neighbor list may include cells that are part of active sets or monitored sets of UE attached to the source cell. In another embodiment, one or more neighbor list used to create an antenna optimization neighbor list for a source cell may come from various network optimization processes such as automated neighbor relations or interference detection. In one embodiment, the neighbor list is from a proprietary system such as Nokia Systems Network (NSN) or Ericsson.

The neighbor list data for the source cell is filtered in step 504. Filtering the neighbor list data may include comparing one or more value in the list data to a threshold value, and removing a base station associated with the value from the list based on the results of the comparison. The value may be an activity metric value. In one embodiment, a value is handover attempts, and when the neighbor list data for a particular base station shows less handover attempts than a threshold value, it is removed from the neighbor list. In an embodiment, entries for base stations with less than 100 handover attempts are removed from the list. In other embodiments, the threshold value for handover attempts may be a different value such as 50, 150, 200, etc., or may be a percentage of all handover attempts from the source base station. In other embodiments, the value may be a distance between the source base station and the base station for the entry, a distance between a UE that collected data on the list and the source base station, etc.

In step 506, entries on the neighbor list are sorted according to a value on the list. In an embodiment, the value is a signal strength value, and entries are sorted in descending order according to signal strength. FIG. 7A shows an example of a list including performance metrics that has been sorted according to signal strength. In the example of FIG. 7A, the signal strength value is Received Signal Code Power (RSCP), but other signal strength measurements are possible. For an LTE cell, a Reference Signal Received Power (RSRP) value may be used. Sorting according to signal strength identifies neighboring base stations with a higher probability of providing service to UE that are within a geographic area of the source cell. In FIG. 7A, each neighbor is identified by the value "CELL########," but in an embodiment each neighbor is identified by a unique cell identifier.

In step 508, the list may be truncated by removing entries beyond a threshold value from the bottom of a list sorted in step 506. In the embodiment shown in FIG. 7A, the threshold value is 25, but it may be other values such as 15 or 40 in other embodiments. Finally, in step 510 the filtered list is stored in a data storage. The data storage may be, for example, data storage 216 at a base station, or data storage 312 at an NRC.

Figure 6:
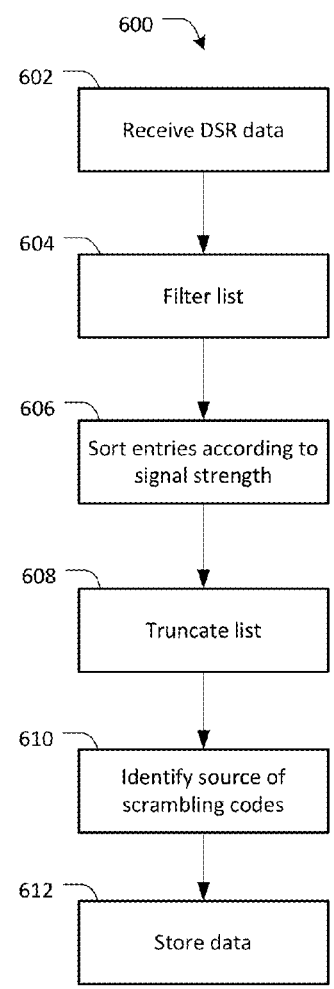
FIG. 6 illustrates a process for creating a neighbor list for a source cell according to an embodiment.

FIG. 6 shows a process 600 for creating a second neighbor list for the source cell. In an embodiment, the second neighbor list is based on detected set reports (DSR) for the source cell, and steps of process 600 will be described with respect to DSR data. An example of such a neighbor list is shown in FIG. 7B.

In step 602, DSR data is received by the base station for the source cell. DSR data may be received as an aspect of routine KPI reporting, or in response to a request from the system. The DSR data may be received at the source base station or at an NRC.

In step 604, the DSR data is filtered according to one or more category such as an activity metric. In one embodiment, the number of counts for each DSR entry is compared to a threshold value, and when the number of counts is less than the threshold value, the entry is removed from the list. An example of a threshold value for counts is 1000, but persons of skill in the art will recognize that other categories are possible, and threshold values may be determined based on system design criteria.

In step 606, base stations on the DSR list are sorted in descending order according to a signal strength value in the reports. In embodiments, the signal strength value may be an RSCP value or an EC/No value. In step 608, the list of DSR data is truncated to remove entries over a predetermined value such as 25.

DSR entries may include scrambling codes for neighboring base stations, but the DSR data may not include unique identifiers for those base stations. The second neighbor list of FIG. 7B has been arranged in descending order according to RSCP and filtered according to count value, but the scrambling codes on the list have not been associated with unique base station identifiers. The unique identifier for a base station can be helpful for determining whether geometric relationships between source and target cells suggest an overshooting condition or an undershooting condition. Thus, a step 610 of identifying a unique base station responsible for signals associated with scrambling may be performed.

In an embodiment, step 610 may be accomplished by comparing the scrambling codes, and possibly other data, with data on an NCL, and when the scrambling code is the same and the data is similar, associating entries with the scrambling code on the DSR with the unique base station identifier from the NCL.

Other embodiments for associating a scrambling code with a unique base station identifier are described in U.S. application Ser. No. 14/033,309 and may be practiced for embodiments of step 610. Finally, the second neighbor list data is stored in a data storage in step 612. The data storage may be, for example, data storage 216 at a base station, or data storage 312 at an NRC.

Although embodiments have been described for creating two separate neighbor lists, in another embodiment one or the other of a mobility neighbor list and a DSR neighbor list may be created. In another embodiment, two or more neighbor lists may be created based on various data, and those neighbor lists may be combined into a single neighbor list. In an embodiment, neighbor lists may be compared, and base stations that are only present on one of the lists may be eliminated.

FIG. 8 shows an embodiment of a process 800 of evaluating a relationship between a source cell and a target cell. With respect to process 800, a target cell is a cell which appears on a neighbor list such as the first and second neighbor lists shown in FIGS. 7A and 7B.

In step 802 of process 800, the pointing direction, or azimuth, of the source cell is determined. In an embodiment, the pointing direction may include a vector from the cell, an angular value relative to a cardinal direction, or a similar value indicating a pointing direction of an antenna for the cell. Determining the pointing direction of a cell may include receiving an azimuth value from a system resource.

Pointing directions of the target cells on the neighbor list are determined in step 804. Pointing directions for the target cells may be determined in the same fashion as step 802.

In step 806, beamwidth values are set for the source cell and target cells. In an embodiment, beamwidth values are set by setting a single variable in the system. In another embodiment, current beamwidth values such as half-power beamwidth values for each cell are read from one or more storage medium. The beamwidth values may be set once in the system as a default value such as 60 degrees, or may be set each time a source cell is analyzed.

Beamwidth geometry for the source and target cells is projected in step 808. Projecting the beamwidth geometry for a cell may include calculating a geographical area by projecting a triangular area with an apex located at the geographical location of the respective cell's base station. The projection may be made with an infinite distance, or a distance which extends through an area which includes the source and target cells.

The relationship between source and target cells is analyzed in step 810. An embodiment of step 810 is shown in FIG. 9, which illustrates an embodiment of a process 900 for determining relationships between projected beamwidth geometries of a source cell and neighboring cells.

FIGS. 10A, 10B, 10C, and 10D illustrate four different relationships between a projected beamwidth geometry of a source cell 1002 and a projected beamwidth geometry of a target cell 1022. In an embodiment, process 900 determines which of these four relationships exist.

Turning back to FIG. 9, relationships between the source cell and target cells are determined in steps 902 to 908. Step 902 determines whether a source cell envelops a target cell. When the projected beamwidth geometry of a source cell envelops a target cell, in step 920 the source cell is classified as having an overshooter relationship with the target cell.

Figure 10A:
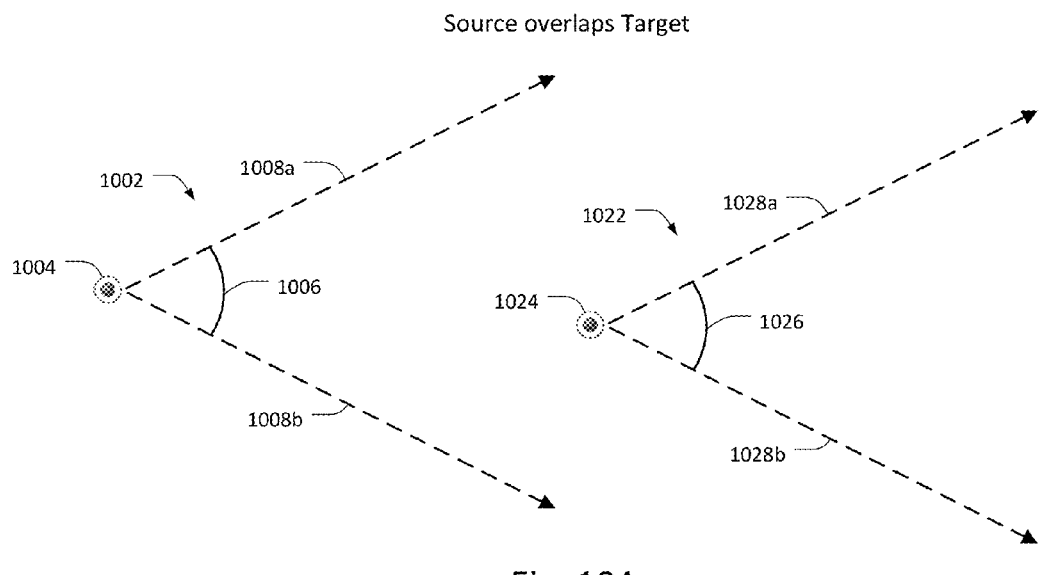
FIGS. 10A, 10B, 10C, and 10D illustrate relationships between a source cell station and neighboring cells according to an embodiment.

FIG. 10A shows beamwidth geometry 1002 is projected from an antenna 1004 using a beamwidth 1006. The dotted lines 1008a and 1008b indicate boundaries of the projected beamwidth geometry of the source cell, and dotted lines 1028a and 1028b show boundaries of the projected beamwidth geometry of the target cell. The beamwidth geometries of the source and target cell are based in part on beamwidth angles 1006 and 1026, respectively. Locations of base stations may be used as locations for corresponding antennas.

In FIG. 10A, the antenna 1024 of the target cell falls within the area of the projected beamwidth geometry 1002 of the source cell, and antenna 1004 of the source cell does not fall within the projected beamwidth geometry 1022 of the target cell. When the source cell is found to envelop the target cell but the target cell does not envelop the source cell, the relationship may be classified as overshooter.

Figure 10B:
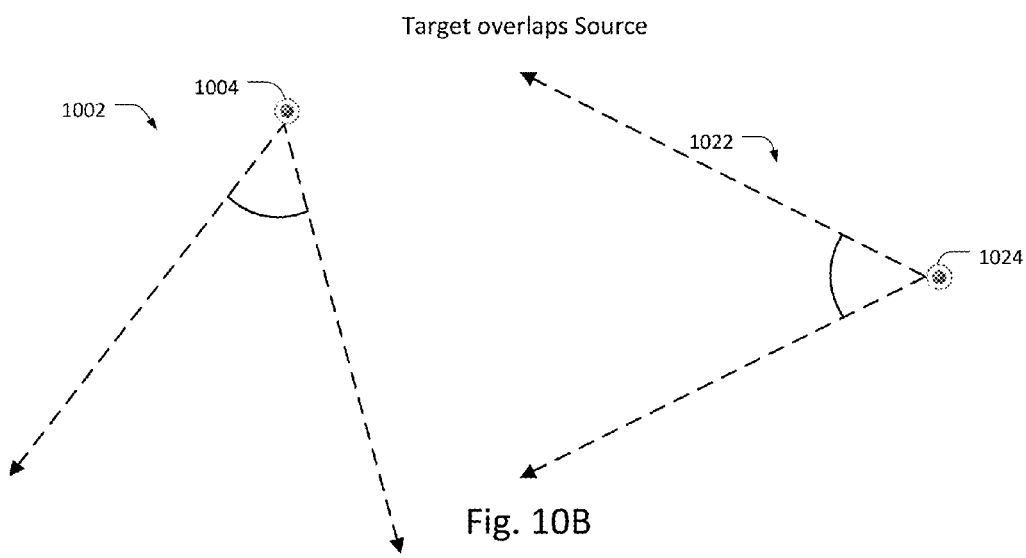

Whether the target cell's projected beamwidth geometry envelops the source cell's geometry is determined in step 904. FIG. 10B shows a scenario in which the projected beamwidth geometry of target cell antenna 1024 envelops source cell antenna 1004, and the projected beamwidth geometry of source cell antenna 1004 does not envelop target cell antenna 1024. When these conditions are satisfied, the source cell is classified as having an undershooter relationship with the target cell in step 922.

Figure 10C:
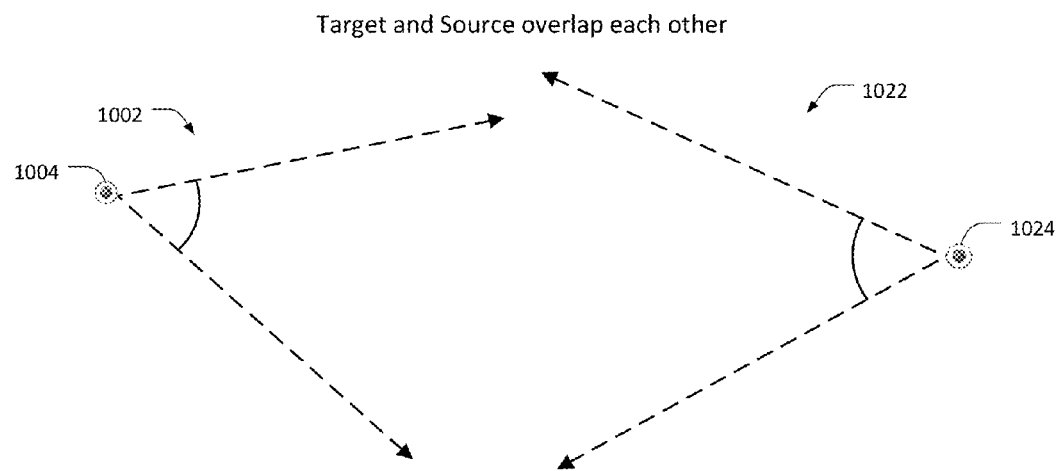

Whether the beamwidth geometries of both the source cell and the target cell envelop each other's base station locations is determined in step 906. FIG. 10C shows a scenario in which the projected beamwidth geometry of target cell base station 1024 envelops source cell antenna 1004, and the projected beamwidth geometry of source cell antenna 1004 envelops target cell antenna 1024. When these conditions are present, a joint relationship is determined as indicated by step 924.

Figure 10D:
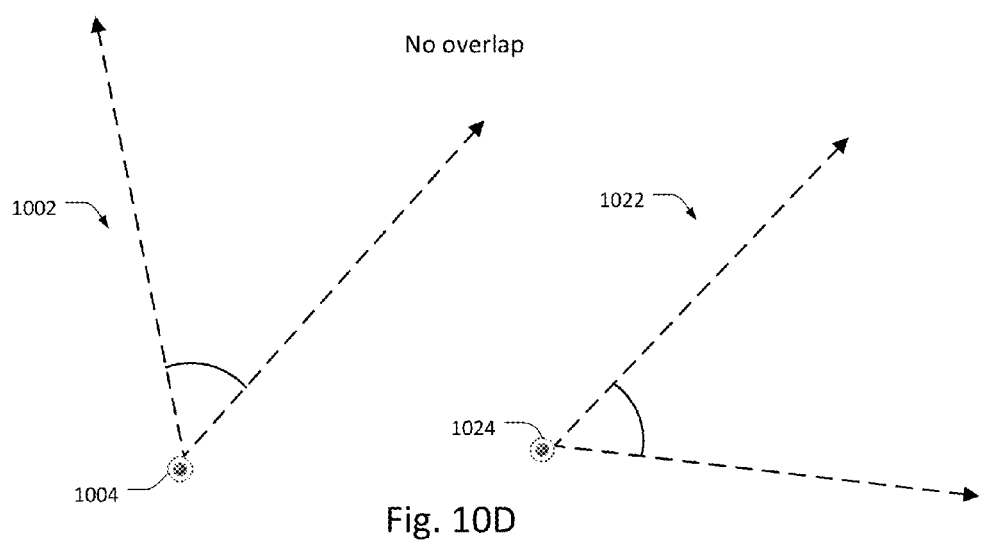

Finally, a no overlap condition is determined in step 908. A no overlap condition is a scenario in which neither projected beamwidth geometry of the source and target cell overlaps the other. An example of such a relationship is illustrated in FIG. 10D. Similar to the mutual overlap scenario of FIG. 10C, when a no overlap scenario is determined, the relationship is classified as joint in step 924.

Although the embodiment shown in FIG. 9 shows four steps of determining whether one of four relationships exist, as with all of the embodiments described in this disclosure, it can be practiced in alternative forms. For example, each relationship between source and target cells can be analyzed by determining whether the source envelops the target, determining whether the target envelops the source, and determining whether an overshoot scenario or an undershoot scenario is present based on the resulting data. In another example, while FIGS. 10A-D are described as using antenna locations 1004 and 1024 to determine overlap, another embodiment may use an area around a base station such as a cellular coverage area. Accordingly, as with all embodiments of this disclosure, FIG. 9 is not limiting.

Figure 11:
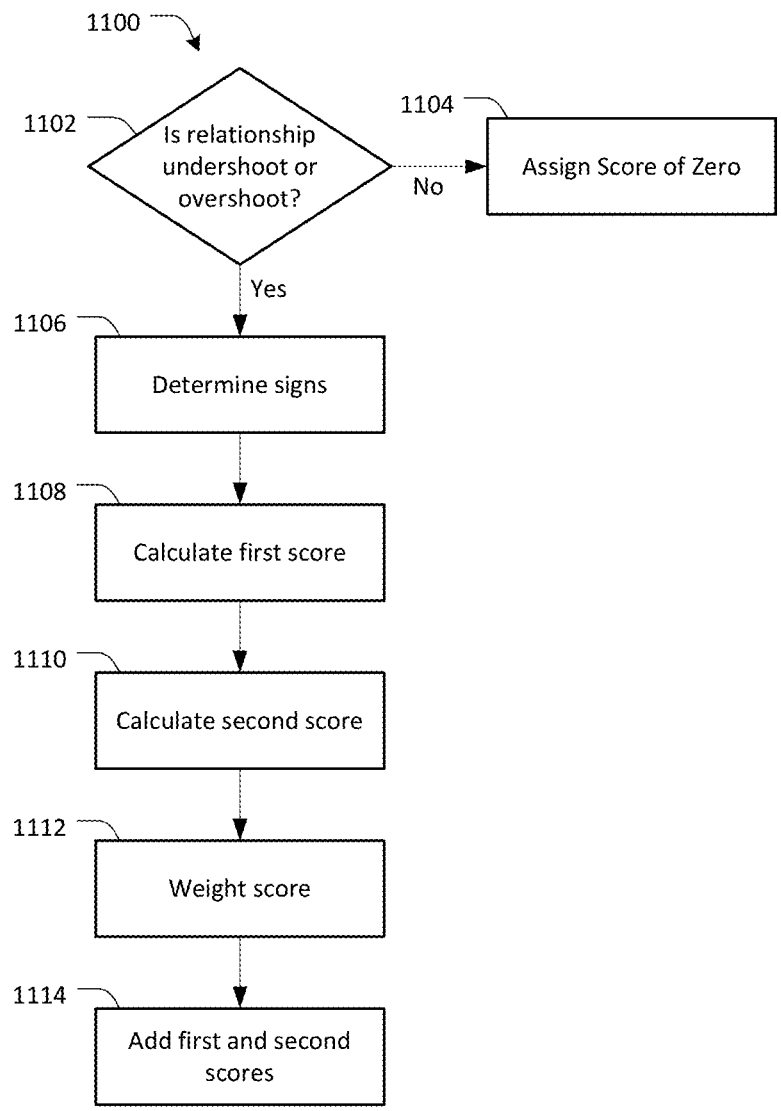
FIG. 11 illustrates a process for calculating a tilt score for a cell according to an embodiment.

FIG. 11 illustrates an embodiment of a process 1100 for calculating a tilt score for a source cell. In an embodiment, some of the overlap scenarios do not influence the final tilt score. For example, when the beamwidth value is close to the actual half-power beamwidth of the cells and neither projected beamwidth geometry overlaps the other as shown in FIG. 10D, the chance of source cell and target cell influencing one another is minimal. In such a scenario, the relationship between the source and target cell is not likely to have significant influence on a determination of optimal antenna tilt of the source cell. When a joint relationship exists in which the source and target cells envelop one another as shown in FIG. 10C, there may be ambiguity regarding the benefit of adjusting the tilt angle for the source cell.

Accordingly, in step 1102, a step of determining whether an undershoot or overshoot relationship is present for each source and target cell combination, and if not, a value of zero is assigned to the distance in step 1104 so that a score for the joint cell is zero when subsequent calculations such as Equation 1 and Equation 2 are performed. In another embodiment, when a joint relationship is present, the entry for the particular target cell is simply removed from consideration in subsequent calculations.

A sign may be determined for scores in step 1106. In various embodiments, the sign may be determined at various phases of antenna optimization. For example, in an embodiment, the sign may be determined when an overshoot or undershoot relationship is determined as described with respect to FIG. 9. When a sign is determined at an early phase, it may be applied to a target cell/source cell relationship by applying the sign to a value associated with the target cell, such as the distance value shown in the lists of FIGS. 7A and 7B.

In an embodiment, a positive sign is associated with an overshoot scenario, and negative sign is associated with an undershoot scenario. In such an embodiment, a positive score implies that the source cell would benefit from a downtilt adjustment, and a negative score implies that the source cell would benefit from an uptilt adjustment. When the signs are reversed, the opposite implications are present.

When an undershoot or overshoot scenario is present, a step 1108 of calculating a first score is performed. One specific embodiment of calculating a first score is provided in Equation 1:

Tilt_Score_Neighbor=$\Sigma d_i$*AVG(max($RSCP_i$−
RSCP_Thresh,0),max($EcNo_i$−EcNo_Thresh,0)) *
(log10($HO\_Count_i$)−log 10(HO_Thresh)+1)   [Equation 1]

Equation 1 may be performed for entries on a mobility neighbor list such as the list shown in FIG. 7A. In equation 1, i=1 to the number of neighbors on a mobility neighbor list, $d_i$ is the distance between the source cell and the $i^{th}$ neighbor cell in kilometers, $EcNo_i$ is the EcNo value for the $i^{th}$ cell, $RSCP_i$ is the RSCP value for the $i^{th}$ cell, and $HO\_Count_i$ is the handover count value for the $i^{th}$ cell. The specific values for distance, EcNo, RSCP, and handover count may be taken from a mobility neighbor list for the source cell. Higher values for distance, EcNo, RSCP and handover count increase the magnitude of the tilt score.

Threshold values such as RSCP_Thresh, EcNo_Thresh, and HO_Thresh may vary between embodiments. In one specific embodiment, the value for RSCP_Thresh is −109 dBm, the value for EcNo_Thresh is −19 dB, and the value for HO_Thresh is 100.

In an embodiment, a second score is calculated in step 1110. One specific embodiment of calculating a first score is provided in Equation 2:

Tilt_Score_DSR=*AVG(max($RSCP_i$−RSCP_Thresh,
0),max($EcNo_i$−EcNo_Thresh,0)) *(log10(DSR_
$Count_i$)−log 10(DSR_Thresh)+1)   [Equation 2]

Equation 2 may be performed for entries on a DSR neighbor list such as the neighbor list 702 shown in FIG. 7B. In equation 1, i=1 to the number of neighbors on a DSR neighbor list, d, is the distance between the source cell and the $i^{th}$ neighbor cell in kilometers, $EcNo_i$ is the EcNo value for the $i^{th}$ cell, $RSCP_i$ is the RSCP value for the $i^{th}$ cell, and $DSR\_Count_i$ is the DSR count value for the $i^{th}$ cell. The specific values for distance, EcNo, RSCP, and DSR count may be taken from a DSR neighbor list for the source cell such as the list of FIG. 7B. Higher values for distance, EcNo, RSCP and DSR count increase the magnitude of the tilt score.

Threshold values for a second neighbor list such as RSCP_Thresh, EcNo_Thresh, and DSR_Count may vary between embodiments. In one specific embodiment, the value for RSCP_Thresh is −109 dBm, the value for EcNo_Thresh is −19 dB, and the value for DSR_Count is 1000. In an embodiment in which first and second scores are calculated, the threshold values may be the same for both calculations as in the examples above. In another embodiment, the variables for calculating the first and second scores are different.

Equation 1 and Equation 2 are merely examples of equations that can be used to calculate a tilt score. Equation 1 uses RSCP as a signal strength component, EcNo as an interference component, and handover count as an activity metric. Other embodiments may use different metrics for similar components. For example, in an LTE system, RSRP can be the metric for a signal strength component. In another embodiment, Received Signal Strength Indication (RSSI) may be used as a signal strength component. An embodiment may have more than one metric for a given component, and embodiments may have more or less than the components that are present in Equation 1 and Equation 2.

After a score is calculated, it may be weighted in step 1112. In an embodiment, one or the other of the first and second scores is multiplied by a weighting factor. A weight may be applied to change the influence of one or more score on the final tilt score.

In step 1114, the first and second scores for a source cell are added together, and the resulting sum is the tilt score for the source cell. When a score is weighted in step 1112, the weighted score is added. In an embodiment in which only one calculated score is used, step 1114 is not performed.

Figure 12:
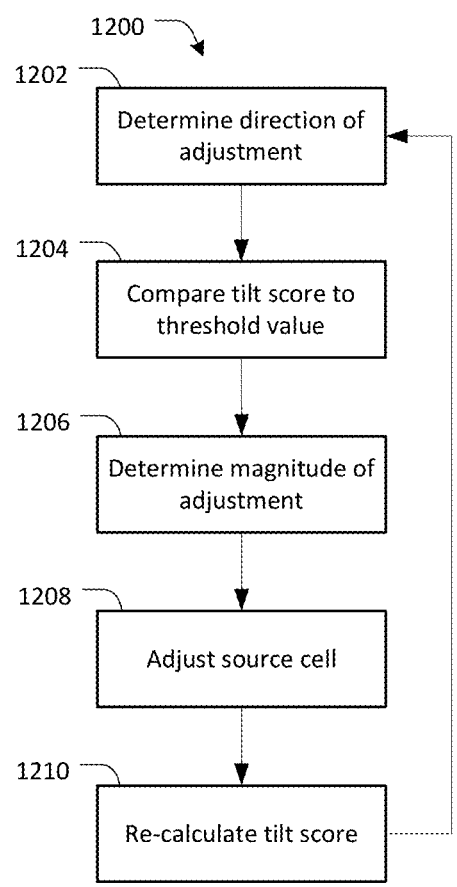
FIG. 12 illustrates a process for adjusting a cell according to an embodiment.

FIG. 12 shows a process 1200 for adjusting a source cell according to an embodiment. As discussed above, the sign of a tilt score may indicate a direction for adjustment. In an embodiment that uses Equation 1 and Equation 2, a positive tilt score suggests that the source cell would benefit from an downtilt adjustment or decrease in transmit power, while a negative tilt score suggests that the source cell would benefit from a uptilt adjustment or an increase in transmit power.

Accordingly, step 1202 of determining a direction for adjustment may include comparing the tilt score to a predetermined value, which in the above example is zero.

In an embodiment in which Equation 1 and Equation 2 are used to determine a tilt score, a tilt score of zero suggests a neutral position that would not benefit from adjustment. A large number of cells in a network may have a non-zero tilt score. However, it may not be practical or economical to adjust every cell that has a non-zero score, especially since parameters of a source cell may affect the scores of neighboring cells. It may not be possible to adjust cells to bring all tilt scores to zero.

Comparing the tilt score to a threshold value in step 1204 may be performed to determine whether to make adjustments to an antenna. In an embodiment, the absolute value of a tilt score is compared to a threshold value, and if the absolute value of the tilt score is greater than the threshold value, an adjustment is made.

In an embodiment, the magnitude of a tilt score reflects the extent to which an antenna would benefit from adjustment. When a tilt score is very large, network performance may improve greatly when the source cell is adjusted. In contrast, when the tilt score is very small, the benefit may be negligible. Accordingly, the magnitude of an adjustment that is made to the source cell antenna may be determined in 1206 based on the magnitude of the tilt score.

For example, in one embodiment the threshold value for step 1204 is 1000, and each 100 points above 1000 corresponds to 0.1 degrees of tilt adjustment. In such an example, a tilt score of 900 would not lead to adjustment, a tilt score of from 1000 and 1099 would result in an antenna adjustment of 0.1 degrees, and a tilt score of from 1500 to 1599 would result in an antenna adjustment of 0.5 degrees. A maximum tilt adjustment may also be enforced for very large tilt scores. For example, if the tilt score is above 2000, the antenna tilt adjustment is 1 degree. However, this is merely an example, and other embodiments are possible. In an embodiment, step 1206 is not performed, and adjustments are made using a predetermined value.

In step 1208, the source cell antenna is adjusted. Adjustment to the source cell antenna may be made by adjusting an antenna tilt angle, adjusting a transmit power, or both. Examples of tilt adjustment values include 0.5 degrees, 1.0 degrees, 3.0 degrees, 5.0 degrees, etc. An example of adjusting transmit power is adjusting the common pilot channel (CPICH) power of a 3G cell.

Adjustments may be applied according to a level of automation present in a cell. For example, a newer base station may be equipped with Remote Electrical Tilt (RET) technology, in which case tilt may be applied automatically. In contrast, an older base station may require a technician to manually adjust an antenna position at the physical location of a base station.

In one embodiment, when transmit power is adjustable remotely but antenna tilt adjustment requires manual intervention, transmit power may be adjusted instead of antenna tilt. A system may determine which base stations are equipped with RET and apply antenna tilt adjustments to those base stations, while adjusting the transmit power of base stations without RET. In another embodiment, transmit power may be adjusted instead of or in addition to tilt angle. For example, when a source cell antenna is at or near the limits of its tilt adjustment capabilities, then transmit power may be adjusted instead. Similarly, when an antenna is at or near an upper or lower power limit, then tilt may be adjusted. In another embodiment, both tilt and transmit power are adjusted simultaneously.

Adjusting a source cell 1200 may be performed as an iterative process. In such an embodiment, after an adjustment is made to a cell, a new tilt score is calculated for that cell in step 1210, and the process reiterates. In an embodiment, an iterative process adjusts a source cell by a predetermined amount and re-calculates the tilt score until it is less than a predetermined value. Iterations may be performed with or without a time delay in various embodiments. A time delay of an hour, a day, or more may be implemented to build a robust set of data from which to calculate a tilt score, or to give a technician time to make manual adjustments.

In other embodiments, the process 1200 of adjusting cells is performed periodically for one or more cells in a network. The process may be performed on an ongoing basis by analyzing all or a subset of cells in a network. The process may be performed on one cell at a time or on multiple cells simultaneously.

In an embodiment, tilt scores are calculated for a plurality of cells in a network, the tilt scores are sorted in descending order in terms of magnitudes (ignoring the sign of the score), and a portion of the cells with the highest magnitudes are adjusted. Additional tilt scores may be calculated after one or more of the adjustments are made, or adjustments may be made to all of the highest scoring cells before making additional measurements.

Figure 13:
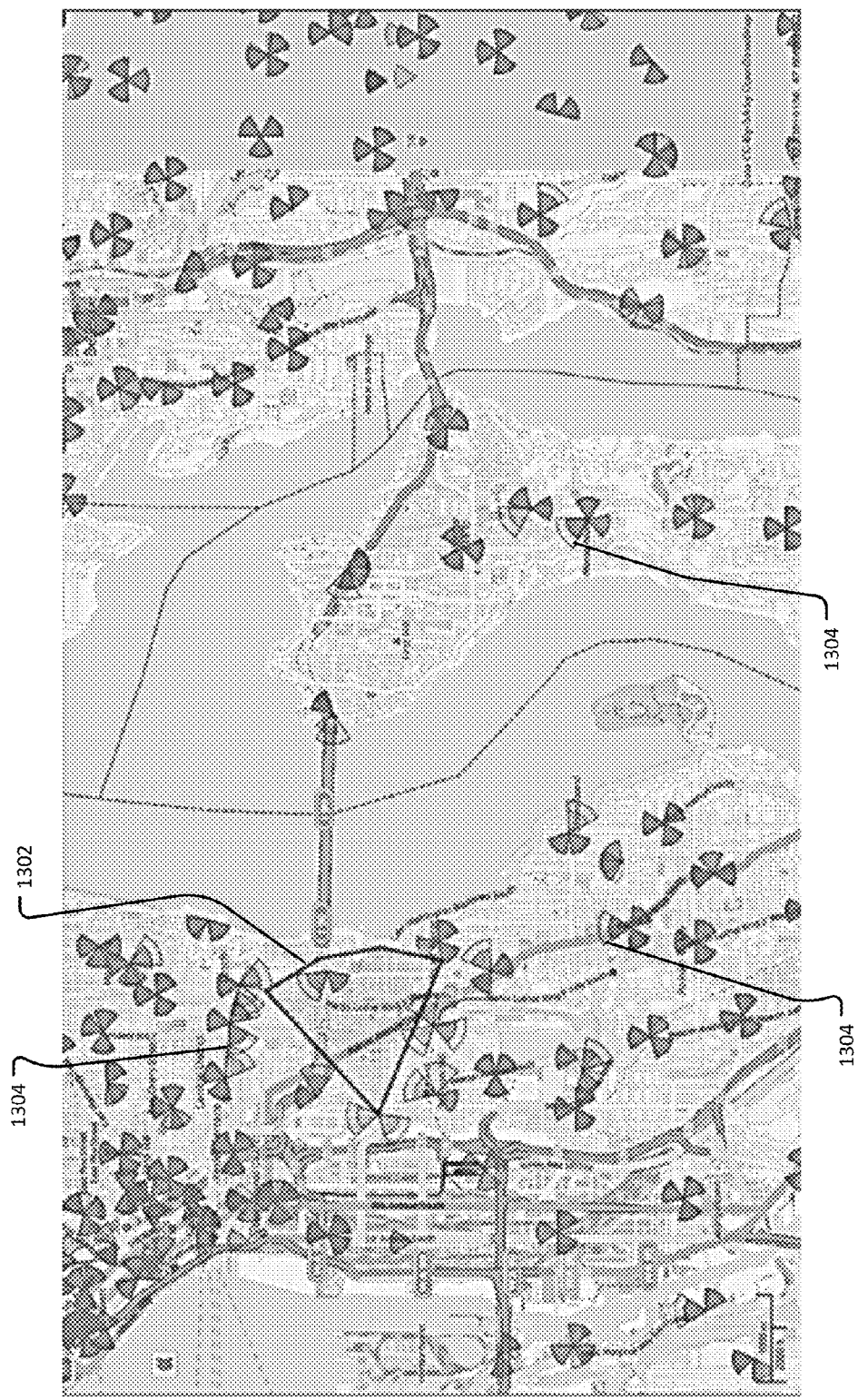
FIG. 13 illustrates a map of a source cell and a plurality of neighboring cells.

A first example of determining antenna adjustments for a source cell will now be described with respect FIGS. 13, 14A, and 14B. FIG. 13 illustrates an example of a map view of a plurality of cells in a communications network. Intra-frequency neighbors 1304 of source cell 1302 are indicated by an arc segment at the far ends of triangular coverage indicators. The density of intra-frequency neighbors 1304 that are pointing in the general direction of source cell 1302 suggest that the source cell may benefit from adjustments to reduce overshooting.

Figure 14A:
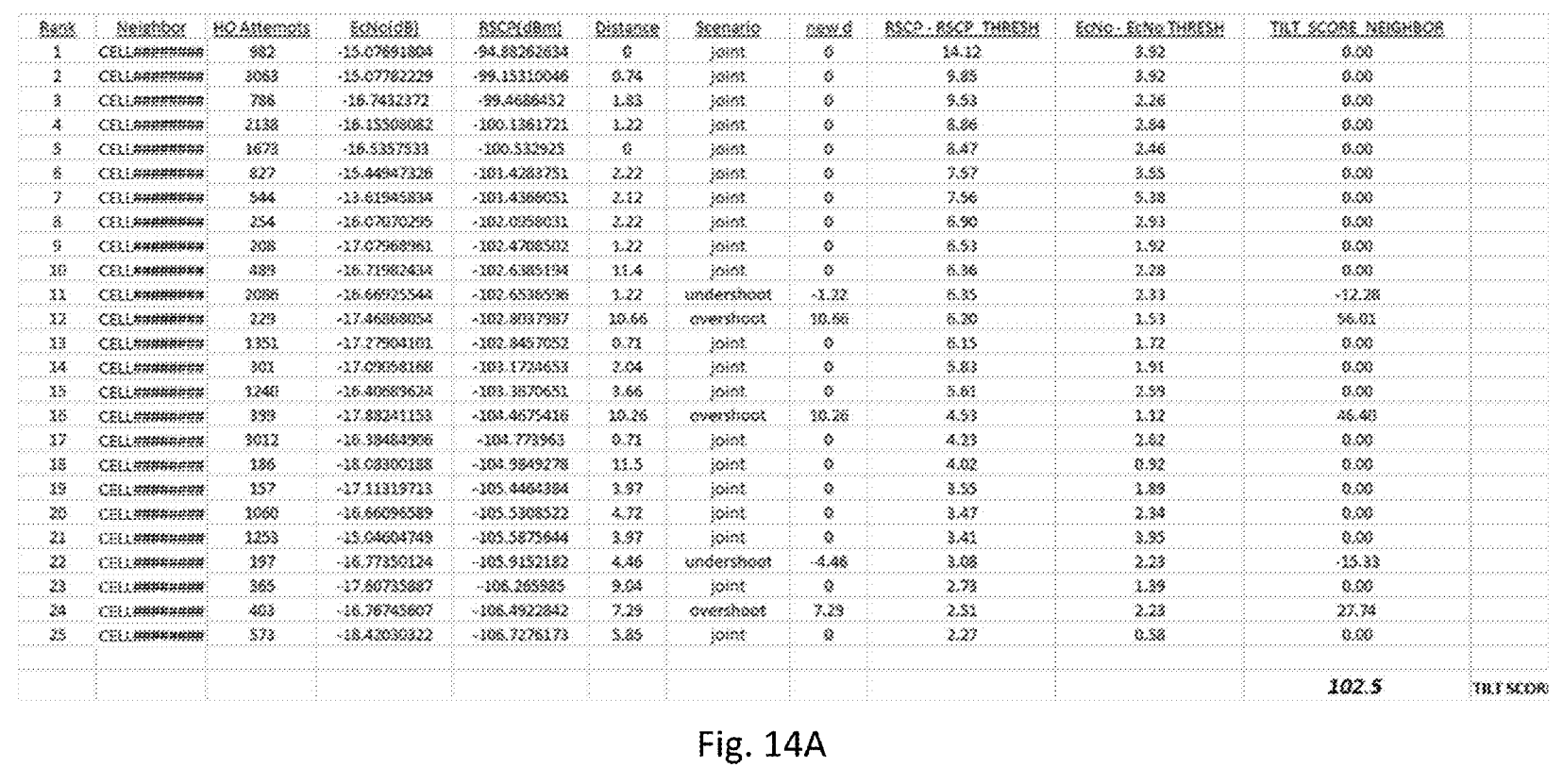

FIG. 14A shows a table of data associated with neighbors from a mobility neighbor list, and the right hand column "TILT_SCORE_NEIGHBOR" includes scores for each mobility neighbor identified in the second column ("neighbor") based on Equation 1. In FIG. 14A, each neighbor is identified by the value "CELL########," but in an embodiment each neighbor is identified by a unique cell identifier. Similarly, FIG. 14B shows a table of data associated with neighbors from a DSR neighbor list. The right hand column, "TILT_SCORE_DSR," includes tilt scores that have been calculated for each DSR neighbor on the list according to Equation 2 above.

Figure 14B:
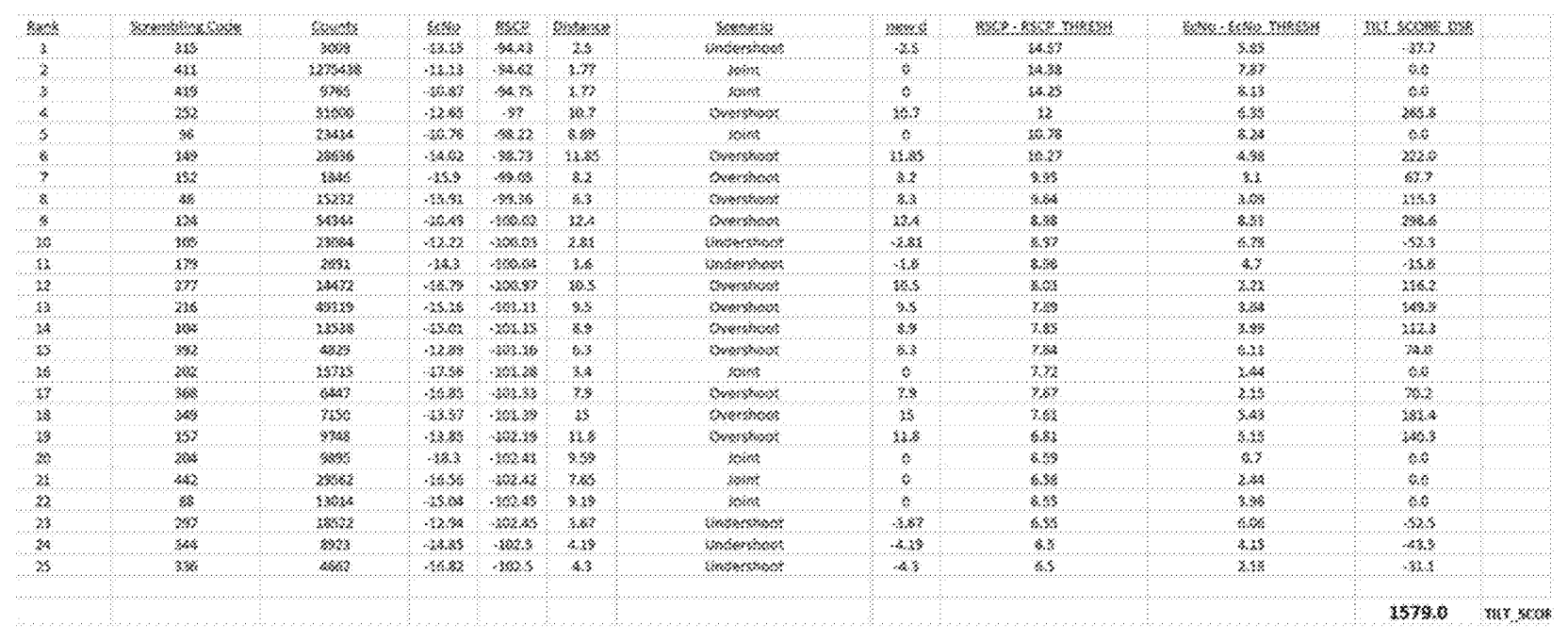

In the table of FIGS. 14A and 14B, the "Scenario" column indicates the relationship between the target cell of a particular row and the source cell. The term "Joint" represents relationships in which the projected beamwidth geometries for the source cell and the target cell envelop each other, or in which neither projected beamwidth geometry envelops the other, as indicated in FIGS. 10C and 10D, respectively. When a joint scenario is present, the value in the "Distance" column is multiplied by zero, so that the value in the "new d" column becomes zero. The value in "new d" may be used as the distance value $d_i$ in Equation 1 and Equation 2. Accordingly, when a joint scenario is present, the tilt score for the target cell is zero.

The term "Overshoot" represents a relationship in which the projected beamwidth geometry of the source envelops the target cell, and the term "Undershoot" represents a scenario in which the projected beamwidth geometry of the target cell envelops the source cell. When an undershoot scenario is present, the Distance value for the target cell is multiplied by negative one so that the value in "new d" is negative. As a result, the tilt score for the target cell in an undershoot scenario is negative. When an overshoot scenario is present, the value in the "Distance" column is used without modification so that the tilt score is positive.

After a summed tilt score for the source cell has been calculated, a weight may be applied to a tilt score as discussed above with respect to step 1112. In an embodiment, weighting a score includes multiplying the score by a weighting factor. If the weighting factor is set to three, then the resulting weighted tilt score for the mobility neighbor list is 307.5 (102.5*3=307.5). In other embodiments, the weighting factor may be less than one, one, five, ten, etc. In some embodiments, other weighting schemes may be applied.

The DSR tilt score and the weighted mobility tilt score are added to arrive at a final tilt score value, which in this example is 1579.0+(102.5*3)=1886.5. The final score is significantly greater than zero, which suggests that performance of the cellular network would benefit from applying downtilt or reducing transmit power of the source cell 1302.

Figure 15:
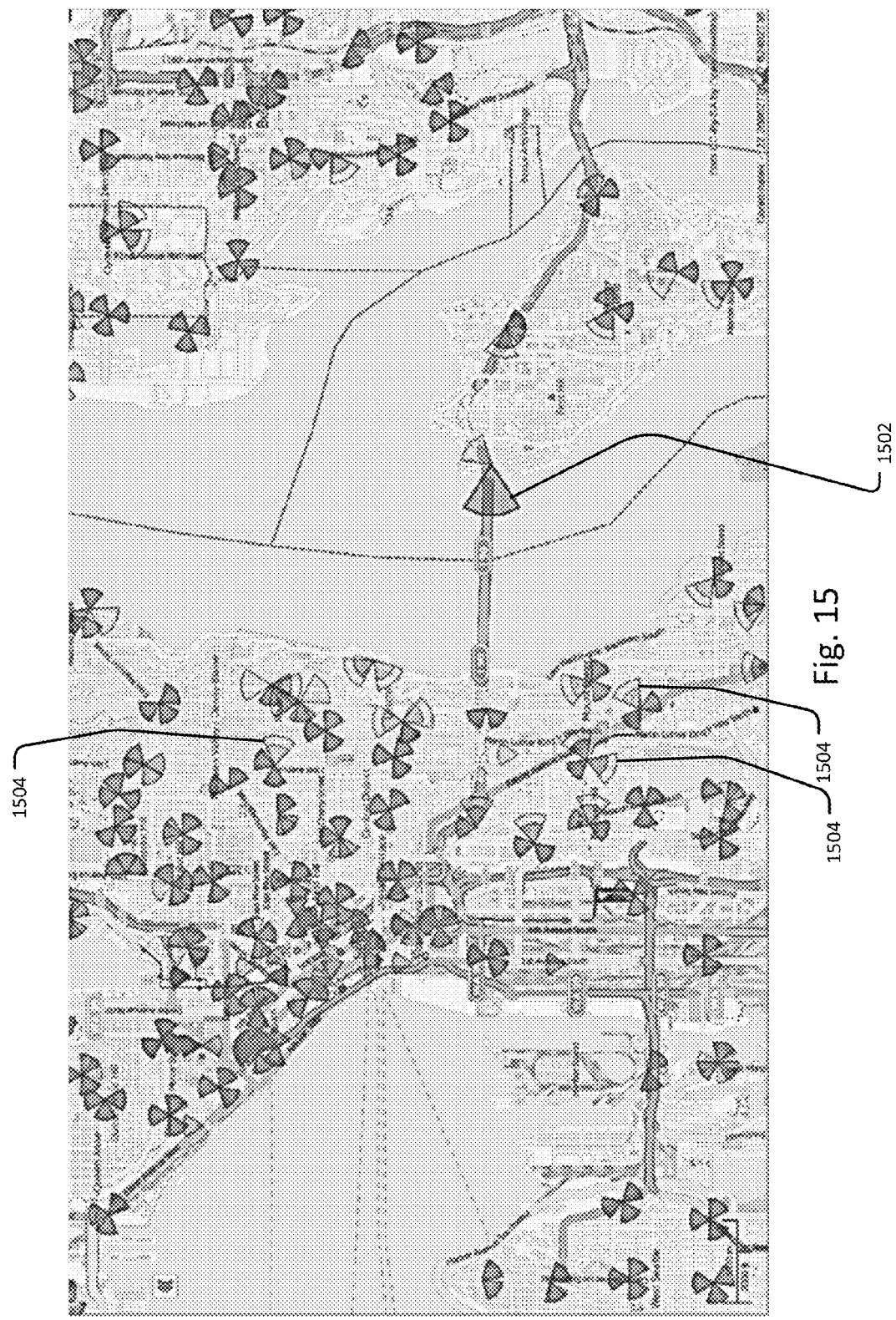
FIG. 15 illustrates a map of a source cell and a plurality of neighboring cells.

A second example of determining antenna adjustments for a source cell will now be described with respect to FIGS. 15, 16A, and 16B. FIG. 15 shows an example of a map view of a plurality of cells in a communications network including a source cell 1502 and a plurality of intra-frequency neighbor target cells 1504. Target cells 1504 are indicated by arc segments at the ends of triangles which represent individual cells. The number of intra-frequency neighbor cells that appear to be within the projected beamwidth geometry of the source cell suggest that the source cell 1502 may benefit from adjustments to reduce undershooting.

FIG. 16A shows a table of data associated with neighbors from a mobility neighbor list, and the right hand column "TILT_SCORE_NEIGHBOR" includes scores for each mobility neighbor identified in the second column ("neighbor") based on Equation 1. Similarly, FIG. 16B shows a table of data associated with neighbors from a DSR neighbor list. The right hand column, "TILT_SCORE_DSR," includes tilt scores that have been calculated for each DSR neighbor on the list according to Equation 2 above.

The summed DSR tilt score is −437, and the summed mobility tilt score is −30.6. Multiplying the mobility tilt score by a weighting factor of 3, the final tilt score for source cell 1502 is −529.0 (−437.2+−30.6*3). A negative score implies that source cell 1502 would benefit from an uptilt adjustment or an increase in transmit power. If the threshold value for applying tilt adjustment is 1000, then the absolute value of the tilt score of −529 means that the source cell is not adjusted. If the threshold value for applying tilt adjustment is 500, then source cell 1502 may be tilted upwards, have its transmit power increased, or both.

A score of −529.0 implies that an uptilt adjustment would improve network performance. In some embodiments, the tilt adjustment algorithm may be run on all the neighbor cells to determine if downtilt of one or more of the neighbor cells would improve network performance. The downtilt could be applied first and after a sufficient period of time, the tilt score for the original source cell can be re-evaluated to determine if an undershoot scenario is still present for the source cell.

Although aspects of certain processes are described as taking place using specific equipment in certain specific situations, persons of skill in the art will recognize that in other embodiments other processes may be performed using other equipment without departing from the scope and spirit of the present invention. Embodiments have been described using data for 3G technology, embodiments are also possible using other communication technologies such as LTE.

What is claimed is:

1. A method for adjusting an antenna of a base station in a cellular telecommunications network, the method comprising:
   collecting at least one of an activity metric, a transmit power, and an interference value for each of a plurality of target cells neighboring a source cell;
   calculating respective first scores for each cell of a portion of the plurality of target cells based on the collected information;
   calculating a tilt score based on the first scores;
   comparing the tilt score to a predetermined value, and when the tilt score exceeds the predetermined value, adjusting at least one of a tilt angle and a transmission power of an antenna of the source cell based on the tilt score.

2. The method of claim 1, wherein collecting the information for the plurality of target cells comprises:
   comparing an activity metric for each cell on a neighbor cell list (NCL) of the source cell to a threshold value; and
   when the activity metric exceeds the threshold value, adding the cell associated with the activity metric to a mobility neighbor list,
   wherein the portion of the plurality of target cells includes cells of the mobility neighbor list.

3. The method of claim 2, further comprising:
   sorting cells on the mobility neighbor list in descending order according to a signal strength value; and
   truncating the mobility neighbor list.

4. The method of claim 1, wherein collecting the information for the plurality of target cells comprises:
   receiving detected set reports (DSR) at the source cell; and
   creating a DSR neighbor list from the received DSRs.

5. The method of claim 4, wherein creating the DSR neighbor list comprises:
   comparing an activity metric for each cell on the DSRs to a threshold value; and
   when the activity metric exceeds the threshold value, adding the cell associated with the activity metric to the DSR neighbor list.

6. The method of claim 5, wherein creating the DSR neighbor list further comprises:
   sorting cells on the DSRs in descending order according to a signal strength value; and
   truncating the list of sorted cells.

7. The method of claim 4, wherein creating the DSR neighbor list comprises associating cell identifiers with scrambling codes of the DSR.

8. The method of claim 1, wherein collecting the information for the plurality of target cells comprises:
   creating a first neighbor list including a first set of performance metrics; and
   creating a second neighbor list including a second set of performance metrics.

9. The method of claim 8, wherein the first neighbor list is a mobility neighbor list, and the second neighbor list is a DSR neighbor list.

10. The method of claim 8, wherein calculating the tilt score includes calculating a first tilt score for the first neighbor list, calculating a second tilt score for the second neighbor list, and adding the first tilt score and the second tilt score.

11. The method of claim 10, further comprising weighting the first tilt score before adding the first tilt score and the second tilt score.

12. The method of claim 1, wherein the collected information includes distance information, signal strength information, and activity information.

13. The method of claim 1, wherein collecting information for the plurality of target cells neighboring a source cell comprises:
   determining a set of intra-frequency cells neighboring the source cell;
   comparing a metric associated with each cell of the set of source cells to a threshold value; and
   when the metric exceeds the threshold value, adding the cell associated with the metric to a list.

14. The method of claim 13, wherein the metric is an activity metric indicating a level of activity with respect to the associated cell.

15. The method of claim 1, wherein adjusting the antenna comprises adjusting one of a transmit power and a tilt angle of the source cell.

16. A wireless communications system comprising:
   a processor;
   a memory; and
   a non-transitory computer readable medium with computer executable instructions stored thereon which, when executed by the processor, perform the following steps:
   collecting information for a plurality of target cells neighboring a source cell;
   calculating respective first scores for each cell of a portion of the plurality of target cells based on the collected information;
   calculating a tilt score based on the first scores; and
   comparing the tilt score to a predetermined value, and when the tilt score exceeds the predetermined value, adjusting an antenna of the source cell based on the tilt score.

17. The system of claim 16, wherein collecting the information for the plurality of target cells comprises:
   comparing an activity metric for each cell on a neighbor cell list (NCL) of the source cell to a threshold value; and
   when the activity metric exceeds the threshold value, adding the cell associated with the activity metric to a mobility neighbor list.

18. The system of claim 17, wherein the non-transitory computer readable medium further comprises instructions for performing steps of:
   sorting cells on the mobility neighbor list in descending order according to a signal strength value; and
   truncating the mobility neighbor list.

19. The system of claim 16, wherein collecting the information for the plurality of target cells comprises:
   receiving detected set reports (DSR) at the source cell; and
   creating a DSR neighbor list from the received DSRs.

20. The system of claim 19, wherein creating the DSR neighbor list comprises:
   comparing an activity metric for each cell on the DSRs to a threshold value; and
   when the activity metric exceeds the threshold value, adding the cell associated with the activity metric to the DSR neighbor list.

21. The system of claim 20, wherein creating the DSR neighbor list further comprises:
   sorting cells on the DSRs in descending order according to a signal strength value; and
   truncating the list of sorted cells.

22. The system of claim 19, wherein creating the DSR neighbor list comprises associating cell identifiers with scrambling codes of the DSR.

23. The system of claim 16, wherein collecting the information for the plurality of target cells comprises:
   creating a first neighbor list including a first set of performance metrics; and
   creating a second neighbor list including a second set of performance metrics.

24. The system of claim 23, wherein the first neighbor list is a mobility neighbor list, and the second neighbor list is a DSR neighbor list.

25. The system of claim 23, wherein calculating the tilt score includes calculating a first tilt score for the first neighbor list, calculating a second tilt score for the second neighbor list, and adding the first tilt score and the second tilt score.

26. The system of claim 25, wherein the first tilt score is weighted before adding the first tilt score and the second tilt score.

27. The system of claim 16, wherein the collected information includes distance information, signal strength information, and activity information.

28. The system of claim 16, wherein collecting information for the plurality of target cells neighboring a source cell comprises:
   determining a set of intra-frequency cells neighboring the source cell;
   comparing a metric associated with each cell of the set of source cells to a threshold value; and
   when the metric exceeds the threshold value, adding the cell associated with the metric to a list.

29. The system of claim 28, wherein the metric is an activity metric indicating a level of activity with respect to the associated cell.

30. The system of claim 16, wherein adjusting the antenna comprises adjusting one of a transmit power and a tilt angle of the source cell.

31. The system of claim 16, wherein the tilt score is calculated based on interference metrics, signal strength metrics, and activity metrics for the plurality of target cells.

* * * * *